US012712296B2

(12) United States Patent
Martin

(10) Patent No.: US 12,712,296 B2
(45) Date of Patent: Aug. 18, 2026

(54) GRATE GROUNDING DEVICE

(71) Applicant: Hubbell Incorporated, Shelton, CT (US)

(72) Inventor: Evan Martin, Litchfield, NH (US)

(73) Assignee: Hubbell Incorporated, Shelton, CT (US)

( * ) Notice: Subject to any disclaimer, the term of this patent is extended or adjusted under 35 U.S.C. 154(b) by 663 days.

(21) Appl. No.: 18/027,983

(22) PCT Filed: Sep. 17, 2021

(86) PCT No.: PCT/US2021/050806
§ 371 (c)(1),
(2) Date: Mar. 23, 2023

(87) PCT Pub. No.: WO2022/066520
PCT Pub. Date: Mar. 31, 2022

(65) Prior Publication Data

US 2023/0378665 A1 Nov. 23, 2023

Related U.S. Application Data

(60) Provisional application No. 63/083,472, filed on Sep. 25, 2020.

(51) Int. Cl.
*H01R 4/64* (2006.01)
*E04C 2/42* (2006.01)
(Continued)

(52) U.S. Cl.
CPC ............... *H01R 4/64* (2013.01); *E04C 2/421* (2013.01); *H01R 4/42* (2013.01); *H01R 43/00* (2013.01); *H01R 4/44* (2013.01)

(58) Field of Classification Search
CPC ... H01R 4/42; H01R 4/44; H01R 4/64; H01R 43/00; E04C 2/421
See application file for complete search history.

(56) References Cited

U.S. PATENT DOCUMENTS 2,898,573 A * 8/1959 Lamb ........................ H01R 4/44 439/781
7,379,782 B1 5/2008 Cocco
(Continued)

FOREIGN PATENT DOCUMENTS

EP 0871244 10/1998
EP 3232513 10/2017
(Continued)

OTHER PUBLICATIONS

Machine Translation of European Patent Publication, EP 3 232 513, Oct. 2025. (Year: 2025).*

(Continued)

*Primary Examiner* — A. Dexter Tugbang
(74) *Attorney, Agent, or Firm* — Dilworth IP, LLC

(57) ABSTRACT

A grounding device, including a top plate including a central portion and a plurality of curved ends, the central portion of the top plate having a hole extending therethrough, a bottom plate including a central portion and a plurality of curved ends, the central portion of the bottom plate having a hole extending therethrough, a cap including a hole and a curved end adapted to retain a grounding wire, and a fastener extending through the holes of the top plate, the bottom plate, and the cap.

15 Claims, 6 Drawing Sheets

(51) Int. Cl.

| | |
|---|---|
| ***H01R 4/42*** | (2006.01) |
| ***H01R 43/00*** | (2006.01) |
| *H01R 4/44* | (2006.01) |

(56) References Cited

U.S. PATENT DOCUMENTS

| | | | |
|---|---|---|---|
| 9,438,648 | B2 | 9/2016 | Asenjo |
| 9,985,361 | B2 | 5/2018 | Martin |
| 2006/0149407 | A1 | 7/2006 | Markham |
| 2018/0090856 | A1 | 3/2018 | Martin |
| 2018/0316307 | A1 | 11/2018 | Martin |
| 2019/0074674 | A1 | 3/2019 | Martin |

FOREIGN PATENT DOCUMENTS

| | | | |
|---|---|---|---|
| FR | 3098885 | | 1/2021 |
| GB | 2157508 | | 10/1985 |
| JP | 2018039020 A | * | 3/2018 |

OTHER PUBLICATIONS

Gu et al, "Design and analysis of clamper for short circuit ground wire," 2012 Power Engineering and Automation Conference, Wuhan, China, 2012, pp. 1-3. (Year: 2012).*
International Search Report and Written Opinion for App. No. PCT/US21/50806, dated Dec. 16, 2021, 8 pages.

* cited by examiner

GRATE GROUNDING DEVICE

FIELD OF THE INVENTION

The present disclosure relates to grounding devices, and more particularly, to a grounding device for grates.

BACKGROUND

Grating is a commonly used structural material in a number of industries. Grating provides a surface that allows air, light, heat, sound, and water to pass through. For example, grating may be used in commercial and industrial flooring including mezzanines, catwalks, ramps, platforms, subways, sidewalks, and trench covers. Grating is often made of steel, particularly stainless steel to provide corrosion resistance, temperature resistance, strength, and durability. Grating may also be made of aluminum. Grating may also have surface treatments such as galvanization, powder coating, or paint.

Grates come in a number of different spans (lengths) and widths and different configurations to suit various applications. A typical grate includes a plurality of rectangular bearing bars with cross rods welded perpendicular thereto (e.g., the top or bottom of the grate) to hold the bearing bars together. In some embodiments, the cross rods may extend through the rectangular bearing bars. Dove tail is a type of grating having a plurality of rectangular bearing bars with rectangular interlocking bars positioned perpendicular thereto.

Thickness of and spacing between the bearing bars may vary based on the application. A common size is "19 space" grating used for pedestrian loads which has spaces of 1³⁄₁₆ in. (i.e., 19 sixteenths) between each parallel bearing bar. The distance between the cross rods is typically about 4 in. The bearing bars generally have a vertical depth of between ¾ in. and 2½ in. and a horizontal thickness of between ⅛ in. and ³⁄₁₆ in. in "19 space" grating. The depth and thickness of the bearing bars is generally dictated by the unsupported span that the grate must extend.

In many applications, grating structures are at risk of being energized by electrical discharges and stray current. Stray current can result from a number of different sources such as nearby electrical wires, railway systems, etc. Stray current often leads to corrosion and can also present a danger to pedestrians. There is presently no convenient and reliable means of grounding grating structures. Typically, grates are grounded either by welding a grounding wire to the grate or welding the grate to another grounded structure.

The present invention solves these and other problems in the prior art.

SUMMARY

An object of the present invention is to provide a grounding device for use on grates and a method of grounding grates.

In one exemplary embodiment according the present disclosure, a grounding device is provided, including a top plate including a central portion and a plurality of curved ends, the central portion of the top plate having a hole extending therethrough, a bottom plate including a central portion and a plurality of curved ends, the central portion of the bottom plate having a hole extending therethrough, a cap including a hole and a curved end adapted to retain a grounding wire, and a fastener extending through the holes of the top plate, the bottom plate, and the cap. The fastener may, for example, be a carriage bolt with a nut secured on a distal end and adjacent to the cap.

In some embodiments, each of the curved ends of the top plate curves in an axial direction toward the bottom plate, and each of the curved ends of the bottom plate curve in an axial direction toward the top plate. In some embodiments, each of the curved ends of the top plate has a width less than an overall width of the top plate and/or taper in width from the central portion to a distal surface. Each of the curved ends of the bottom plate may also have a width less than the overall width of the bottom plate.

In some embodiments, the plurality of curved ends of the top plate includes two first curved ends opposite one another to engage the grounding device at least partially around top surfaces of two adjacent bearing bars of a grate. The plurality of curved ends of the top plate may further include two second curved ends opposite one another, wherein at least one of the two second curved ends extends between interior side surfaces of the two adjacent bearing bars of the grate. The bottom plate may be similarly constructed such that first curved ends engage the grounding device at least partially around bottom surfaces of the two adjacent bearing bars of the grate and/or at least one second curved end extends between interior side surfaces of the two adjacent bearing bars of the grate.

Further provided is a method of grounding a grate, including steps of providing a grounding device having a top plate, a bottom plate, a cap adapted to retain a grounding wire, and a fastener connecting the top plate, the bottom plate, and the cap, positioning the top plate on a top surface of the grate extending at least partially over two adjacent bearing bars of the grate, positioning the bottom plate on a bottom surface of the grate extending at least partially under the two adjacent bearing bars of the grate, positioning the cap below the bottom plate, positioning a grounding wire between the cap and the bottom plate, and engaging the fastener to secure the top and bottom plates to the adjacent bearing bars and the cap to the bottom plate.

In some embodiments, at least a portion of the bottom plate is positioned below a portion of a structure surrounding the grate thereby securing the grate to the structure.

In some embodiments, the step of positioning the top plate on the top surface of the grate includes extending at least one curved end of the top plate between interior side surfaces of the two adjacent bearing bars of the grate. In some embodiments, the step of positioning the bottom plate on the bottom surface of the grate includes extending at least one curved end of the bottom plate between the two adjacent bearing bars of the grate.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The present disclosure may be understood more readily by reference to the following detailed description of the disclosure taken in connection with the accompanying drawing figures, which form a part of this disclosure. It is to be understood that this disclosure is not limited to the specific devices, methods, conditions, or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure.

A grounding device for grate structures is disclosed herein. Reference will now be made in detail to the illustrative embodiments of the present disclosure, which are illustrated in the accompanying figures.

Figure 1:
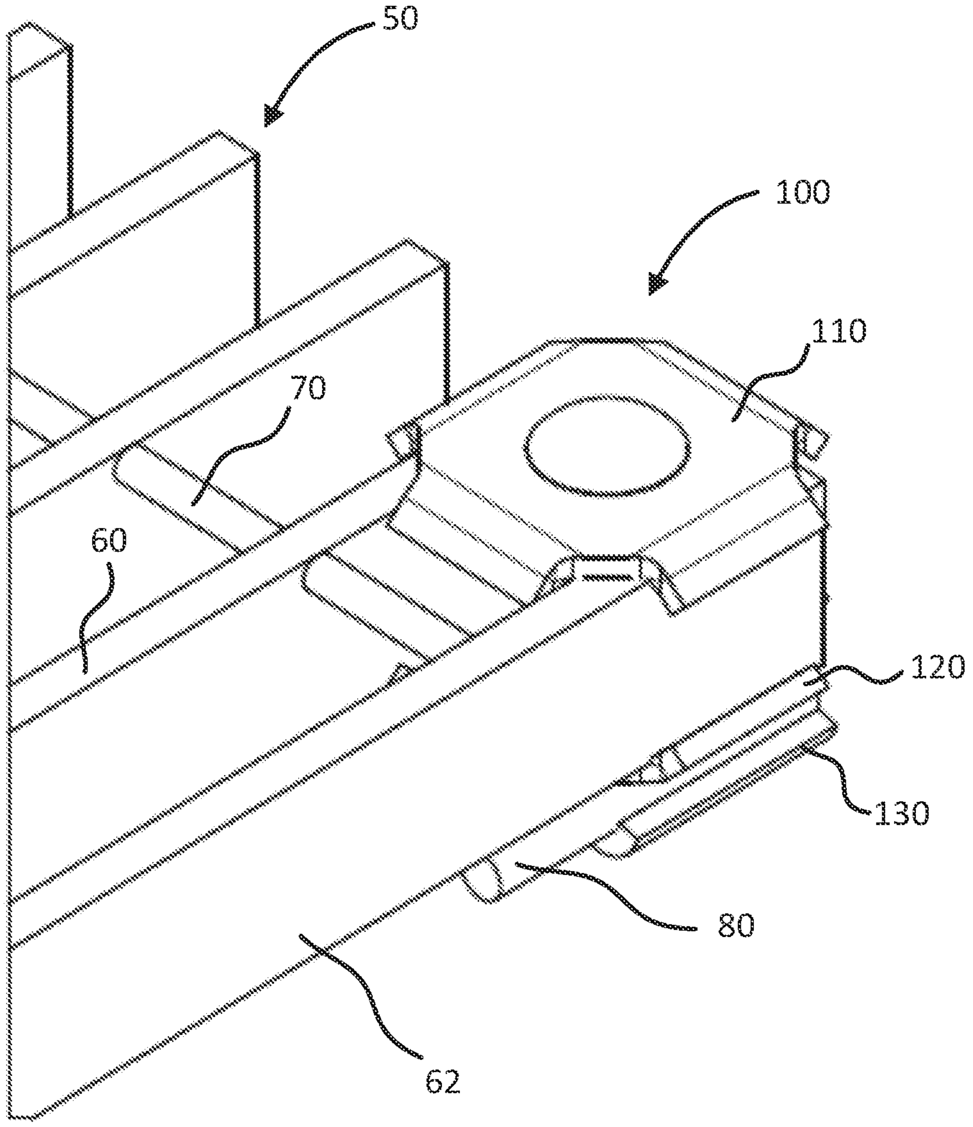
FIG. 1 is an orthogonal view of a grounding device according to an exemplary embodiment of the present disclosure with the grounding device mounted in a grate.

FIG. 1 illustrates a grounding device 100 attached to a grate structure or grate 50. The grate 50 may rest on a support structure, such as a ledge around an opening. The grate 50 includes a plurality of bearing bars 60,62 and a plurality of cross bars or rods 70. Each bearing bar 60,62 has a depth (measured vertically between the top and bottom surfaces) and a thickness (measured horizontally between the two opposite side surfaces). The cross rods 70 are attached perpendicular to the bearing bars 60,62. The cross rods 70 may be welded to, extend through, and/or interlock with the bearing bars 60,62. While only a portion of the grate 50 is shown, the grate 50 may have any number of bearing bars 60,62 and cross rods 70 as necessary to achieve a desired span and width.

The grounding device 100 is adapted to attach between two adjacent bearing bars 60,62. As grates 50 may be manufactured in different sizes, the grounding device 100 may be made in different sizes to accommodate different spacing measurements between the bearing bars 60, 62. For example, and without limitation, the grounding device 100 may be sized to extend between a "19 space" grate having a 1³⁄₁₆ in. spacing between bearing bars. In some embodiments, the grounding device 100 is adjustable to accommodate a range of sizes.

The grounding device 100 includes a top plate 110 and a bottom plate 120 which engage top and bottom surfaces, respectively, of the bearing bars 60,62. A cap 130 is secured below the bottom plate 120 to retain a grounding wire 80. The grounding wire 80 may be attached to nearby or adjacent structure to achieve grounding of the grate 50. In some embodiments, the grounding device 100 may also secure the grate 50 to a support structure. This may be achieved by one or both plates 110,120, and/or the cap 130, engaging with the support structure (see, e.g., FIG. 9).

Figure 2:
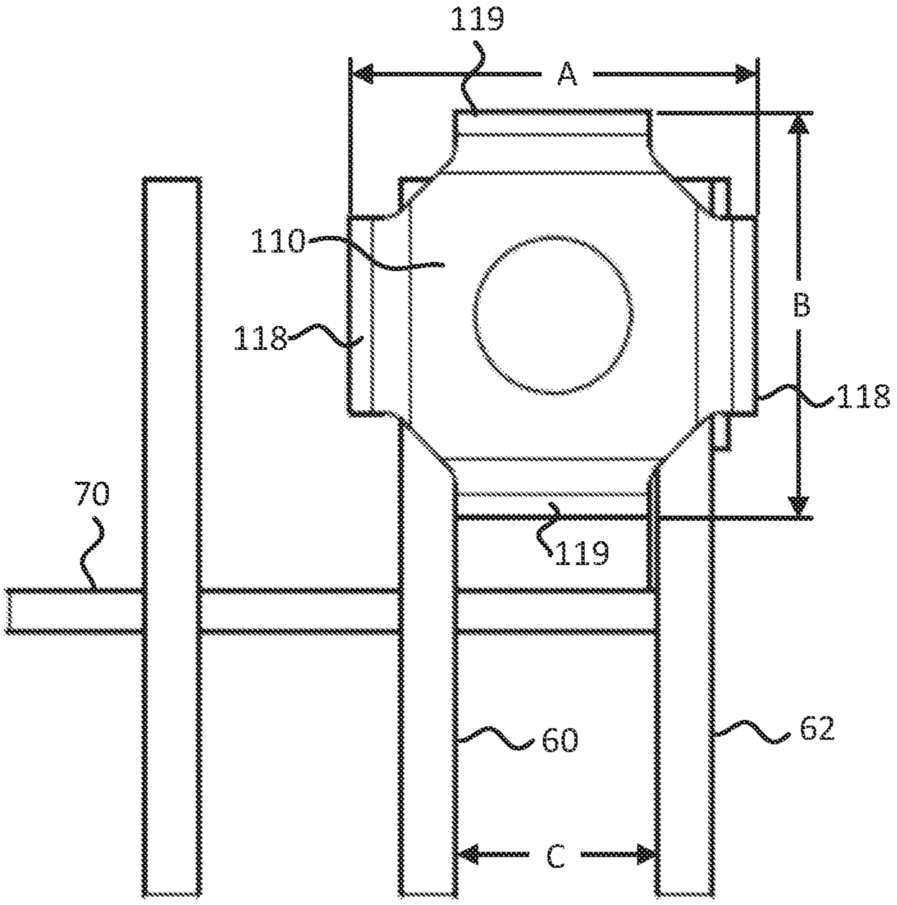
FIG. 2 is a top view of the grounding device according to an exemplary embodiment of the present disclosure mounted in the grate.

FIG. 2 is a top view of the grounding device 100 on the grate 50. As shown, the top plate 110 of the grounding device 100 at least partially extends over the adjacent bearing bars 60,62. The bottom plate 120 of the grounding device 100 at least partially extends under the adjacent bearing bars 60,62. The top and bottom plates 110,120 each have a width A. The width A is greater than a width C of a space between interior side surfaces of the bearing bars 60,62, and preferably equal to or greater than the width C plus the combined thicknesses of the adjacent bearing bars 60,62. The top and bottom plates 110,120 also each have a length B. In the exemplary embodiment, the width A and length B are approximately equal to one another. However, width A and length B may be different in some applications.

Figure 3:
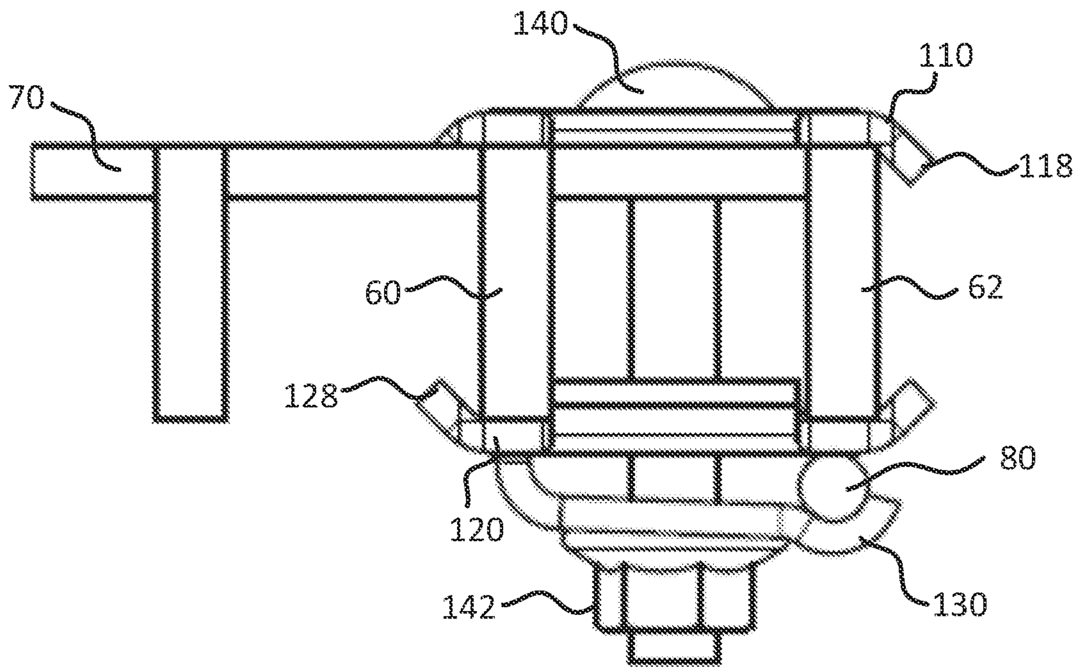
FIG. 3 is a front view of the grounding device according to an exemplary embodiment of the present disclosure mounted in the grate.
Figure 4:
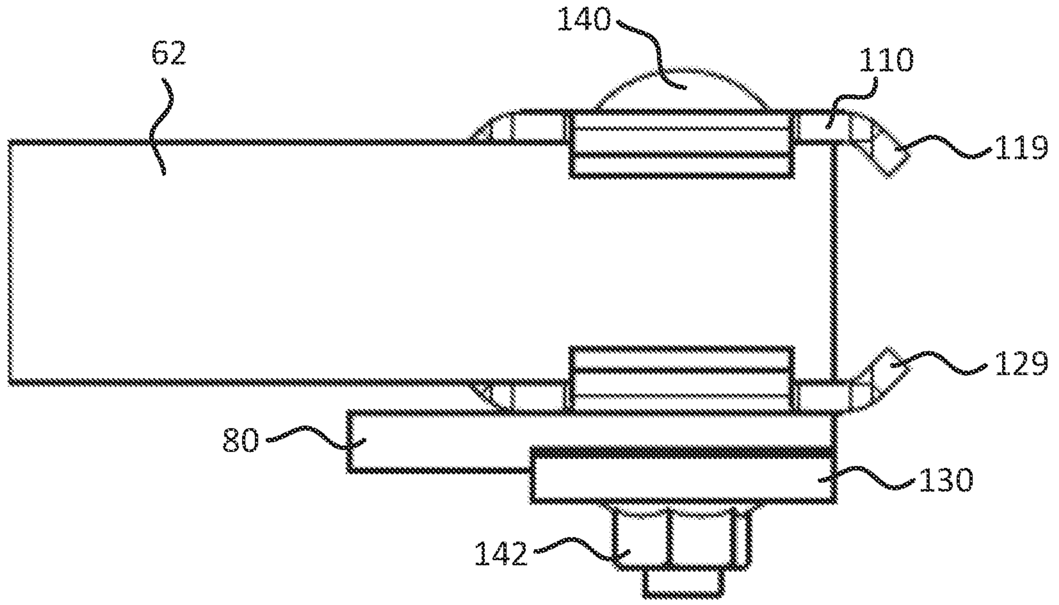
FIG. 4 is a side view of the grounding device according to an exemplary embodiment of the present disclosure mounted in the grate.

The top plate 110 has a central portion, which is generally flat, and at least two and preferably four curved or bent projections defining distal ends or edges of the top plate 110. In particular, the top plate 110 has two curved ends 118 extending opposite one another in the widthwise direction and two curved ends 119 extending opposite one another in the lengthwise direction. As shown in FIGS. 3 and 4, the curved ends 118, 119 generally curve in an axial direction of the device 100. The ends 118 extend at least partially over and around the bearing bars 60,62 while at least one of the ends 119 is positioned to extend at least partially in between the bearing bars 60,62. In the exemplary embodiment, at least the ends 119 have or taper to a reduced width that is less than or equal to the width C so as to fit in the space.

FIGS. 3 and 4 are front and side views, respectively, of the grounding device 100 according to an exemplary embodiment of the present disclosure mounted in the grate 50. Like the top plate 110, the bottom plate includes curved ends 128 and 129. The distal ends 118,119 of the top plate 110 curve in a direction towards the bottom plate 120. The distal ends 128,129 of the bottom plate 120 curve in a direction towards the top plate 110. The cap 130 has at least one curved end to engage around and secure the grounding wire 80. The grounding device 100 is held together with a fastener 140 such as a carriage bolt with a nut 142.

Figure 5:
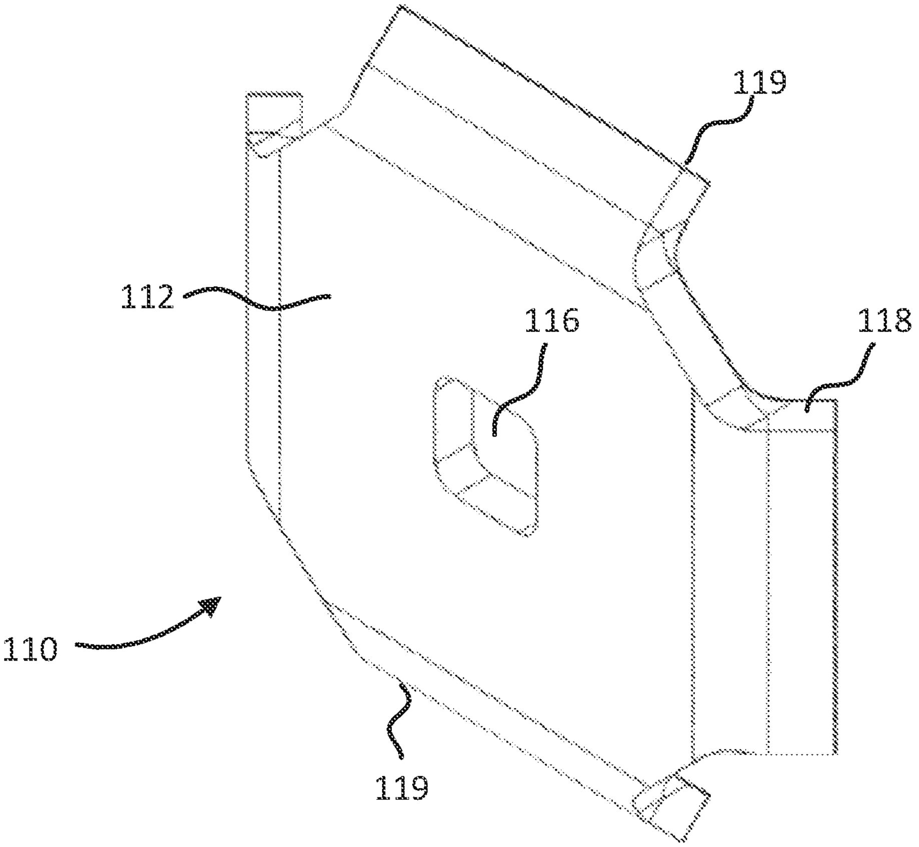
FIG. 5 is an orthogonal view of a plate of a grounding device according to an exemplary embodiment of the present disclosure.
Figure 6:
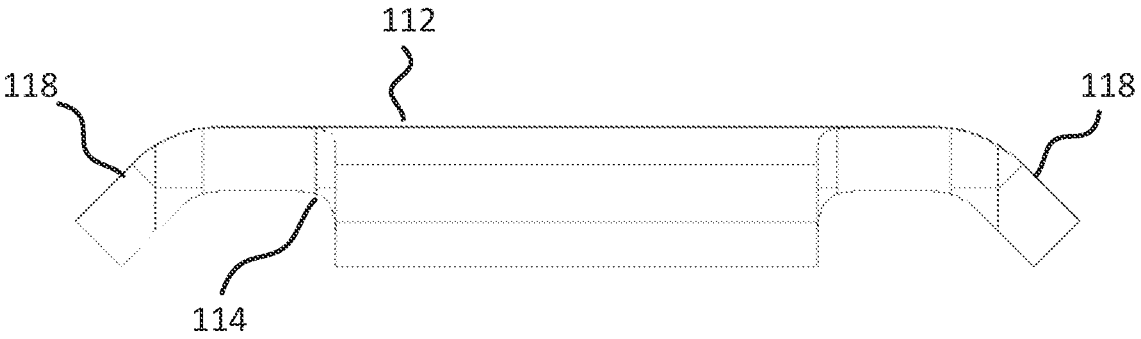
FIG. 6 is a side view of the plate shown in FIG. 5.

FIGS. 5 and 6 are orthogonal and side views, respectively, of a plate 110 of the grounding device 100. The central portion of the plate 110 has an exterior surface 112 and an interior surface 114. The interior surface 114 is adapted and sized to rest against the bearing bars 60,62. In the exemplary embodiment, the curved ends 118,119 are positioned at an angle of between 10 and 80 degrees with respect to the exterior surface 112, preferably between 30 and 60 degrees, or about 45 degrees. In the exemplary embodiment, the distal surfaces of the curved ends 118,119 are positioned below the interior surface 114.

The plate 110 further includes a hole 116 to receive the fastener 140. In the exemplary embodiment, the hole 116 is square shaped to receive a square neck of a carriage bolt and prevent rotation. In some embodiments, the top and bottom plates 110,120 are substantially the same though they may differ in other embodiments. For example, the bottom plate 120 may have a circular hole. The bottom plate 120 may also have a different width or length than the top plate 110 to engage surrounding structure and secure the grate 50 in place.

Figure 7:
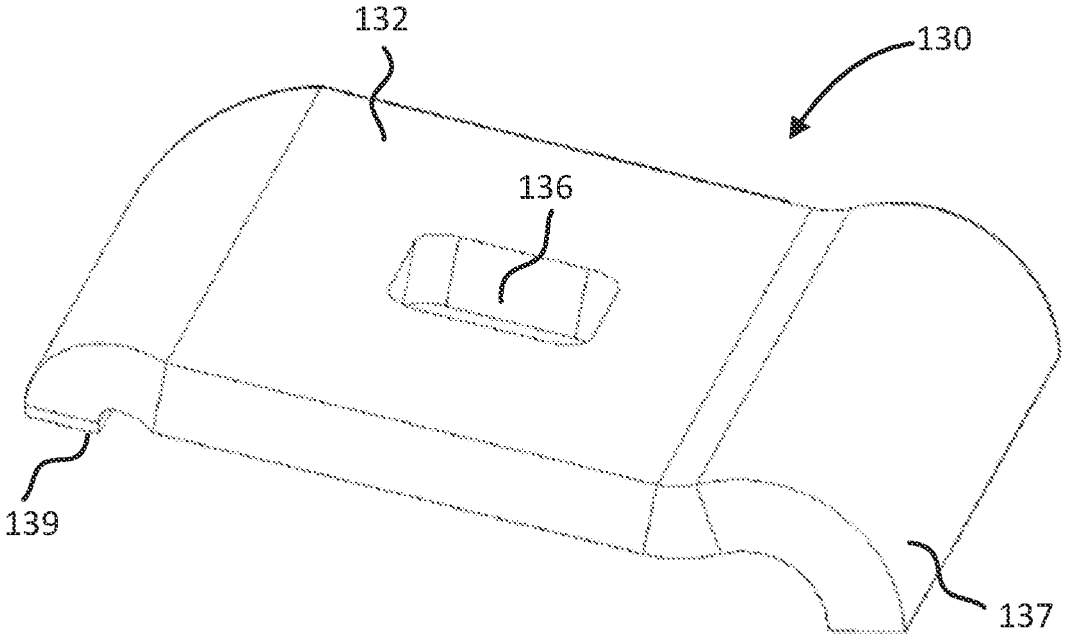
FIG. 7 is a bottom orthogonal view of a cap of a grounding device according to an exemplary embodiment of the present disclosure.
Figure 8:
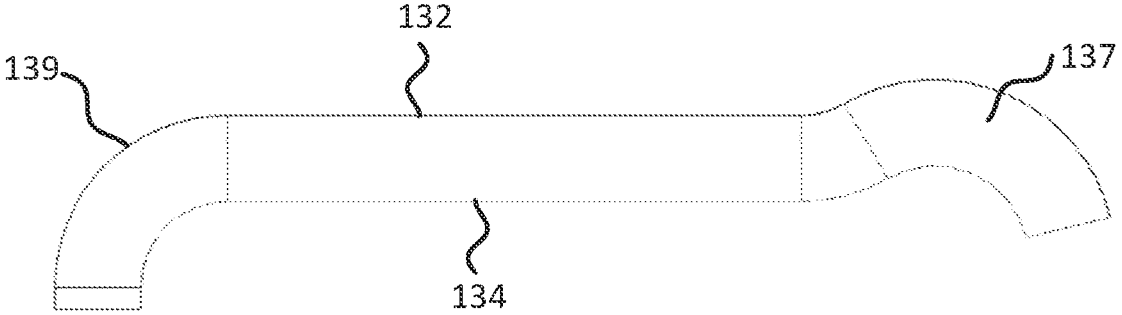
FIG. 8 is a side view of the cap shown in FIG. 7.

FIGS. 7 and 8 are bottom orthogonal and side views, respectively, of the cap 130 of the grounding device 100. The cap 130 has a central portion with an exterior surface 132 and an interior surface 134. The cap 130 includes a hole 136 to receive the fastener 140. The cap 130 also has at least one curved end 137 to engage around and secure the grounding wire 80. The radius of the curved end 137 may be selected to accommodate a particular size or ranges of sizes of grounding wires 80. The cap 130 may also have a second curved end 139 which, in this embodiment, has a smaller radius and a flat distal end to rest against the bottom plate 120.

Figure 9:
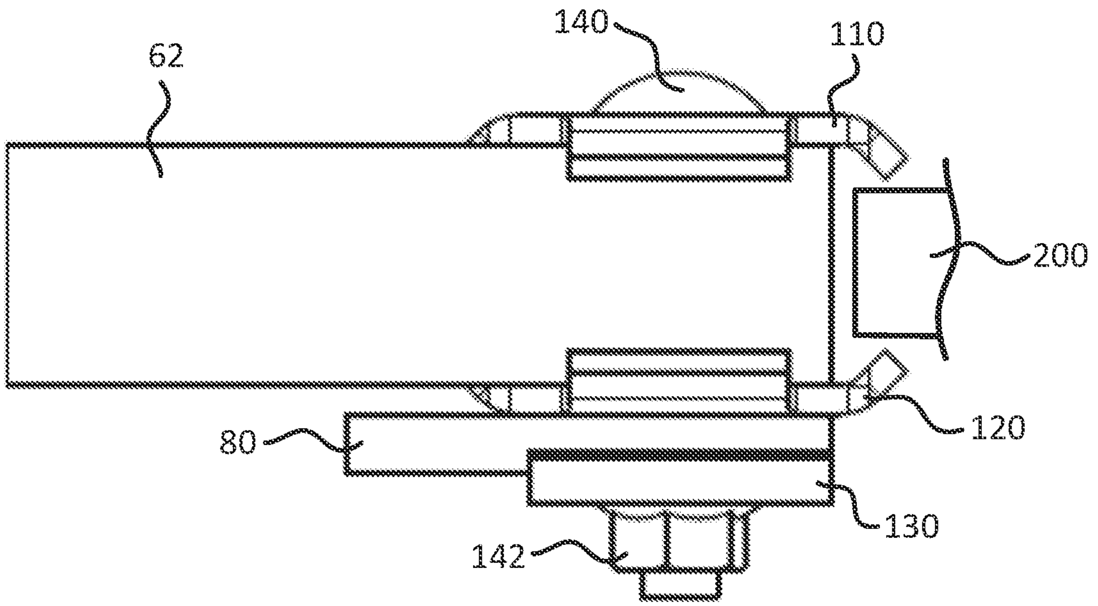
FIG. 9 is a side view of a grounding device according to an exemplary embodiment of the present disclosure securing the grate to a structure.

FIG. 9 is a side view of a grounding device 100 mounted to a structure 200. This figure illustrates one non-limiting example of how the grounding device 100 may secure the grate 50 to a structure 200. At least one end of the bottom plate 120 extends below a portion of the structure 200 to prevent the grate 50 from being lifted up and removed. In the exemplary embodiment, at least one end of the top plate 110 extends over the portion of the structure 200.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A grounding device, comprising:

a top plate including a central portion and a plurality of curved ends, the central portion of said top plate having a hole extending therethrough;

a bottom plate including a central portion and a plurality of curved ends, the central portion of said bottom plate having a hole extending therethrough;

a cap including a hole and a curved end adapted to retain a grounding wire; and a fastener extending through the holes of said top plate, said bottom plate, and said cap, wherein the plurality of curved ends of said top plate includes two first curved ends opposite one another to engage the grounding device at least partially around top surfaces of two adjacent bearing bars of a grate.

2. The grounding device of claim 1, wherein each of the curved ends of said top plate curves in an axial direction at least partially toward said bottom plate, and wherein each of the curved ends of said bottom plate curves in an axial direction at least partially toward said top plate.

3. The grounding device of claim 1, wherein each of the curved ends of said top plate has a width less than an overall width of said top plate.

4. The grounding device of claim 3, wherein each of the curved ends of said top plate tapers in width from the central portion to a distal surface.

5. The grounding device of claim 3, wherein each of the curved ends of said bottom plate has a width less than the overall width of said bottom plate.

6. The grounding device of claim 1, further comprising a nut secured on a distal end of the fastener and adjacent to said cap.

7. The grounding device of claim 6, wherein said fastener is a carriage bolt.

8. The grounding device of claim 1, wherein the plurality of curved ends of said top plate further includes two second curved ends opposite one another.

9. The grounding device of claim 8, wherein at least one of the two second curved ends extends between interior side surfaces of the two adjacent bearing bars of the grate.

10. The grounding device of claim 1, wherein the plurality of curved ends of said bottom plate includes two first curved ends opposite one another to engage the grounding device at least partially around bottom surfaces of the two adjacent bearing bars of the grate.

11. A method of grounding a grate, comprising steps of:

providing the grounding device of claim 1;

positioning the top plate on the grate with the two first curved ends extending at least partially around the top surfaces of the two adjacent bearing bars of the grate;

positioning the bottom plate on a bottom surface of the grate extending at least partially under the two adjacent bearing bars of the grate;

positioning the cap below the bottom plate;

positioning a grounding wire between the cap and the bottom plate; and engaging the fastener to secure the top and bottom plates to the adjacent bearing bars and the cap to the bottom plate.

12. The method of claim 11, wherein at least a portion of the bottom plate is positioned below a portion of a structure surrounding the grate thereby securing the grate to the structure.

13. The method of claim 11, wherein the step of positioning the bottom plate on the bottom surface of the grate includes extending at least one of the curved ends of the bottom plate between the two adjacent bearing bars of the grate.

14. The method of claim 11, wherein the fastener includes a nut secured on a distal end of the fastener and adjacent to the cap.

15. The method of claim 14, wherein the fastener is a carriage bolt.

* * * * *